United States Patent
Ono

(10) Patent No.: US 11,809,175 B2
(45) Date of Patent: Nov. 7, 2023

(54) ALARM MANAGEMENT APPARATUS, ALARM MANAGEMENT METHOD, AND COMPUTER-READABLE RECORDING MEDIUM

(71) Applicant: YOKOGAWA ELECTRIC CORPORATION, Tokyo (JP)

(72) Inventor: Yusuke Ono, Tokyo (JP)

(73) Assignee: YOKOGAWA ELECTRIC CORPORATION, Tokyo (JP)

(*) Notice: Subject to any disclaimer, the term of this patent is extended or adjusted under 35 U.S.C. 154(b) by 0 days.

(21) Appl. No.: 17/687,200

(22) Filed: Mar. 4, 2022

(65) Prior Publication Data
US 2022/0308569 A1    Sep. 29, 2022

(30) Foreign Application Priority Data
Mar. 29, 2021  (JP) ................. 2021-055975

(51) Int. Cl.
G05B 23/02 (2006.01)
G08B 29/04 (2006.01)
G06F 3/0484 (2022.01)
G08B 21/18 (2006.01)

(52) U.S. Cl.
CPC ....... *G05B 23/027* (2013.01); *G05B 23/0235* (2013.01); *G06F 3/0484* (2013.01); *G08B 21/182* (2013.01); *G08B 29/04* (2013.01)

(58) Field of Classification Search
CPC . G05B 23/027; G05B 23/0235; G06F 3/0484; G08B 21/182; G08B 29/04
See application file for complete search history.

(56) References Cited

U.S. PATENT DOCUMENTS

| 5,768,119 A | * | 6/1998 | Havekost | G05B 23/0208 709/224 |
| 2008/0255681 A1 | * | 10/2008 | Scott | G05B 23/0216 700/12 |
| 2016/0132048 A1 | * | 5/2016 | Kambe | G05B 19/418 700/87 |

FOREIGN PATENT DOCUMENTS

| JP | 2005-346444 | | 12/2005 |
| JP | 2007011854 A | * | 1/2007 |
| JP | 2012-9064 | | 1/2012 |
| JP | 2012079203 A | * | 4/2012 |
| JP | 5036754 B2 | * | 9/2012 |
| JP | 2013-105291 | | 5/2013 |
| JP | 2013-161380 A | | 8/2013 |

(Continued)

OTHER PUBLICATIONS

Japanese Office Action (JPOA) dated May 9, 2023 issued in Japanese patent application No. 2021-055975 and its English machine translation.

(Continued)

*Primary Examiner* — Hongmin Fan
(74) *Attorney, Agent, or Firm* — Rankin, Hill & Clark LLP

(57) ABSTRACT

An alarm management apparatus detects a state transition of a plant based on output information that includes at least an alarm that is output from the plant or an instruction from a user, and changes, in a case where the state transition is detected, first definition information that is definition information on behavior of the alarm during monitoring to second definition information that is the definition information that corresponds to a state of the plant after a transition.

8 Claims, 11 Drawing Sheets

(56) References Cited

FOREIGN PATENT DOCUMENTS

JP          2016-85501 A     5/2016

OTHER PUBLICATIONS

Japanese Office Action (JPOA) dated Aug. 15, 2023 and issued in Japanese Patent Application No. 2021-055975 and its English machine translation.

\* cited by examiner

FIG.4

| | WHETHER OR NOT IT IS POSSIBLE TO SET RANGE OF APPLICATION |
|---|---|
| SYSTEM STATE | YES |
| HIERARCHICAL STATE | NO |

FIG.5

| | SYSTEM STATE | HIERARCHICAL STATE |
|---|---|---|
| STATE DURING OPERATION | ○ | ○ |
| STATE DURING MAINTENANCE | ○ | ○ |
| STATE DURING COMMISSIONING | ○ | ○ |
| STATE DURING ENGINEERING | ○ | ○ |
| SYSTEM ABNORMAL STATE | ○ | × |
| EMERGENCY SITUATION STATE | ○ | × |

| ALARM MESSAGE MONITORING SCREEN | | | | |
|---|---|---|---|---|
| Level | Timestamp | Timestamp Server | Message No | Message |
| ▽ | 2021/02/02 09:25:17 | 2021/02/02 09:29:09 | 1101 | MAINNPAS_··· |
| !⬠ | 2021/02/02 09:26:04 | 2021/02/02 09:26:05 | 1107 | TAG_S11··· |
| ○ | 2020/12/04 21:31:31 | 2020/12/04 21:31:33 | 1206 | ANNP01··· |
| ⋮ | ⋮ | ⋮ | ⋮ | ⋮ |

ALARM MANAGEMENT APPARATUS, ALARM MANAGEMENT METHOD, AND COMPUTER-READABLE RECORDING MEDIUM

CROSS-REFERENCE TO RELATED APPLICATION

The present application claims priority to and incorporates by reference the entire contents of Japanese Patent Application No. 2021-055975 filed in Japan on Mar. 29, 2021.

BACKGROUND OF THE INVENTION

1. Field of the Invention

The present invention relates to an alarm management apparatus, an alarm management method, and a computer-readable recording medium.

2. Description of the Related Art

For process control of a variety of plants that use petroleum, petroleum chemistry, chemistry, a gas, and/or the like, an alarm system has conventionally been known that notifies an operator that monitors a plant of an alarm that is output from a field instrument or the like of the plant so as to induce suitable handling thereof (see, for example, Japanese Patent Application Publication No. 2016-085501).

However, in a conventional technique, there is room for further improvement in improving efficiency of an operation of an engineer and an operator in alarm monitoring of a plant.

In general, visibility of an alarm in an alarm system as described above and/or behavior of an alarm such as an authority of an operation such as confirmation and/or a monitoring range of each operator reflects on a system through predetermined engineering work that includes design and/or a test that is executed by an engineer.

However, such engineering work has to be usually executed not only a time of a start of an operation of a system but also in a case where maintenance and/or the like such as addition, repair, and/or replacement of a field instrument that is provided as a monitoring target is executed. For example, for a case of a plant where an operation has to be continued even if a part of a system is temporarily stopped for maintenance, a lot of useless alarms may be generated by such a temporary stop so as to disturb an operation.

However, engineering work frequently has to pass through a process(es) such as approval and/or well-knowing as well as design and/or a test as described previously. Therefore, an engineer has to follow a cumbersome procedure every time engineering work has to be executed.

Furthermore, it is difficult for an operator to efficiently and accurately recognize, even if engineering work is well known to him/her, how behavior of an alarm is changed thereby and what a state which instrument or a whole plant is provided in by such a change.

SUMMARY OF THE INVENTION

According to one aspect of an embodiment, an alarm management apparatus includes: a detection unit, and a changing unit. The detection unit is configured to detect a state transition of a plant based on output information that includes at least an alarm that is output from the plant or an instruction from a user. The changing unit is configured to change, in a case where the state transition is detected, first definition information that is definition information on behavior of the alarm during monitoring to second definition information that is the definition information that corresponds to a state of the plant after a transition.

According to one aspect of an embodiment, in an alarm management method, a computer executes a process. The process includes: detecting a state transition of a plant based on output information that includes at least an alarm that is output from the plant or an instruction from a user; and changing, in a case where the state transition is detected, first definition information that is definition information on behavior of the alarm during monitoring to second definition information that is the definition information that corresponds to a state of the plant after a transition.

According to one aspect of an embodiment, a computer-readable recording medium having stored therein an alarm management program that causes a computer to execute a process. The process includes: detecting a state transition of a plant based on output information that includes at least an alarm that is output from the plant or an instruction from a user; and changing, in a case where the state transition is detected, first definition information that is definition information on behavior of the alarm during monitoring to second definition information that is the definition information that corresponds to a state of the plant after a transition.

BRIEF DESCRIPTION OF THE DRAWINGS

FIG. 4 is an explanatory diagram (part 1) of a "state" according to an embodiment.

FIG. 5 is an explanatory diagram (part 2) of a "state" according to an embodiment.

DETAILED DESCRIPTION OF THE PREFERRED EMBODIMENTS

Figure 1:
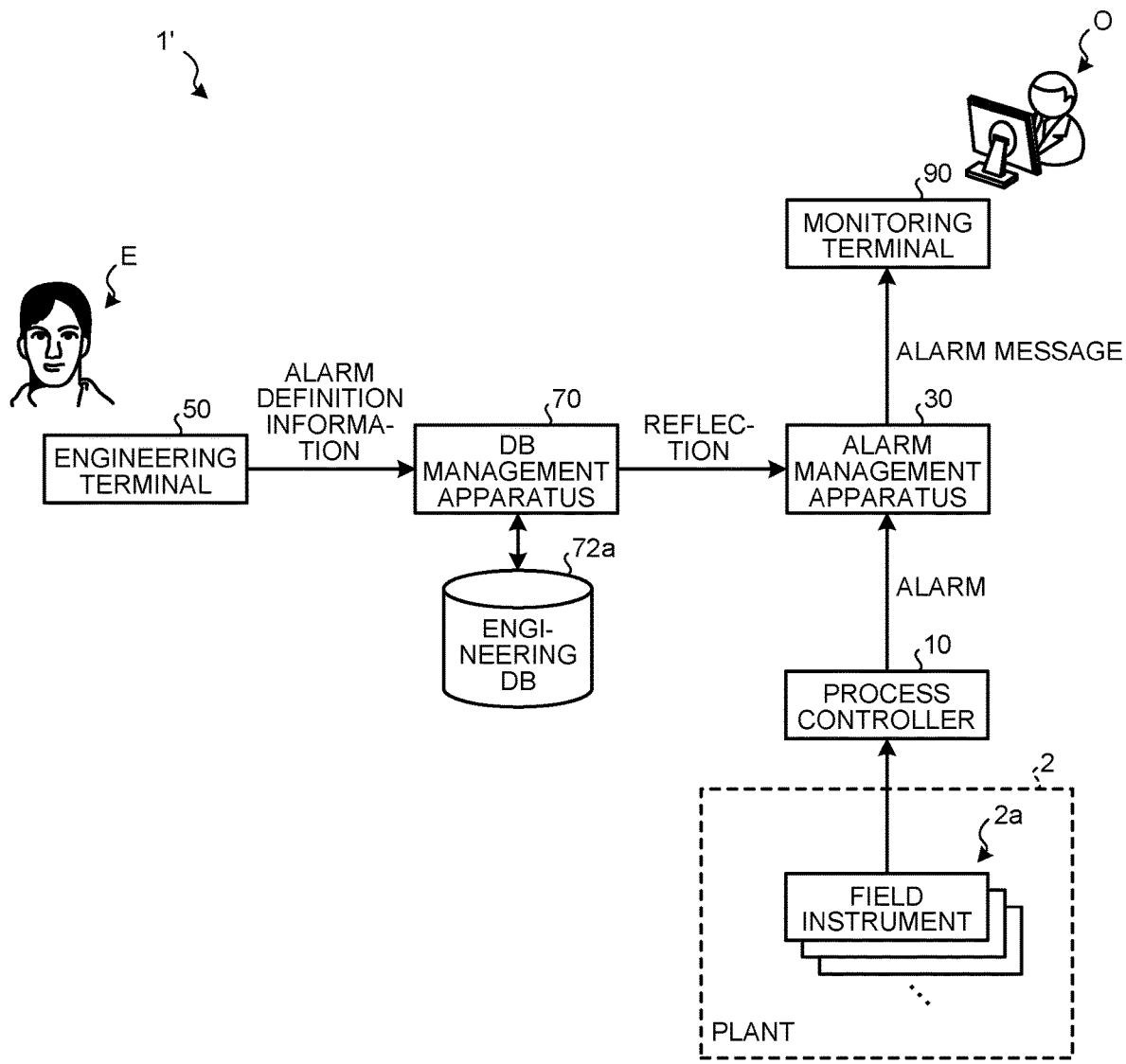
FIG. 1 is a diagram that illustrates a general configuration example of a general-purpose alarm system.

Hereinafter, a practical example of an alarm management apparatus, an alarm management method, and a computer-readable recording medium as disclosed in the present application will be explained in detail based on the drawing(s). Additionally, this invention is not limited by such a practical example. Furthermore, an identical element will be provided with an identical sign so as to omit a redundant explanation thereof appropriately and it is possible to combine respective embodiments appropriately unless inconsistency is provided therebetween.

Comparative Example

Figure 2:
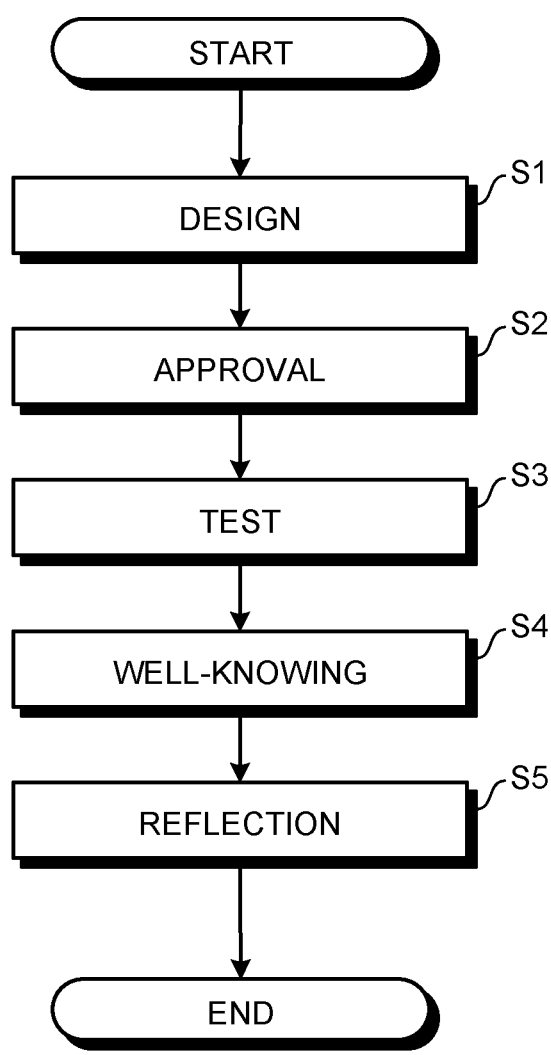
FIG. 2 is a diagram that illustrates a flow of engineering work.

First, a comparative example of the present embodiment will be explained for the sake of clarity of an explanation. FIG. 1 is a diagram that illustrates a general configuration example of a general-purpose alarm system 1'. Furthermore, FIG. 2 is a diagram that illustrates a flow of engineering work.

The alarm system 1' is an alarm system for process industry that is constructed on the basis of ISA 18.2 and/or IEC 62682 that is an international standard(s). As illustrated in FIG. 1, the alarm system 1' includes a plant 2, a process controller 10, an alarm management apparatus 30, an engineering terminal 50, a database (DB) management apparatus 70, and a monitoring terminal 90.

The plant 2 and the process controller 10 are connected so as to be mutually communicable through a network where illustration thereof is omitted. Similarly, the process controller 10 and the alarm management apparatus 30 are connected so as to be mutually communicable. Similarly, the alarm management apparatus 30, the database management apparatus 70, and the monitoring terminal 90 are connected so as to be mutually communicable. Similarly, the database management apparatus 70 and the engineering terminal 50 are connected so as to be mutually communicable. Additionally, FIG. 1 does not have to illustrate a physical configuration. Therefore, for example, the alarm management apparatus 30, the database management apparatus 70, the monitoring terminal 90, and the like may be present in an identical machine. In such a case, for mutual communication as described above, communication is executed by interior communication.

The plant 2 is an example of a variety of plants that use petroleum, petroleum chemistry, chemistry, a gas, and/or the like, and includes a factory and/or the like that include(s) various facilities for obtaining a product. An example of a product is a liquefied natural gas (LNG), a resin (a plastic, nylon, and/or the like), a chemical product, and/or the like. An example of a facility is a factory facility, a machine facility, a production facility, a power generation facility, a storage facility, a facility around a well where petroleum, a natural gas, or the like is mined, and/or the like.

The plant 2 includes a variety of instruments for producing a product, a plurality of field instruments 2a that acquire information on a state of an inside of the plant 2, and/or the like in an inside thereof.

Each field instrument 2a is an example of a sensor that is set at various places of the plant 2 and/or the like. The field instrument 2a is broadly divided (or is classified) into, for example, a sensor instrument and an operation instrument. A sensor instrument is, for example, an instrument that acquires (detects, measures, and/or the like) a physical quantity. An example of a sensor instrument is a pressure sensor, a temperature sensor, a pH sensor, a velocity sensor, an acceleration sensor, and/or the like. An operation instrument is, for example, an instrument that operates a physical quantity. An example of an operation instrument is a valve, a pump, a fan, and the like, and is driven by a motor, an actuator, and the like.

Each field instrument 2a is connected so as to be communicable with the process controller 10 by wireless communication, a wire, and/or the like.

The process controller 10 is a device that collects data from each field instrument 2a and executes process control as process data. Furthermore, the process controller 10 notifies the alarm management apparatus 30 of an alarm in a case where abnormality in process data values, communication abnormality in each field instrument 2a, a hardware abnormality, and/or the like is/are detected.

The alarm management apparatus 30 is a device that provides a function that is a core of alarm monitoring. The alarm management apparatus 30 receives notification of an alarm from the process controller 10 and controls state transition of such an alarm according to alarm definition information where visibility of an alarm and/or behavior of an alarm such as an authority of an operation such as confirmation and/or a monitoring range for each operator are preliminarily defined. Furthermore, the alarm management apparatus 30 notifies the monitoring terminal 90 of transition of a state of an alarm as an alarm message.

The engineering terminal 50 is a device that provides a tool group for defining an attribute value that indicates behavior of an alarm to an engineer E. Such a tool group includes a User Interface (UI) for defining an attribute value. The database management apparatus 70 is notified of alarm definition information that is defined herein and the database management apparatus 70 registers it in an engineering database 72a.

The database management apparatus 70 is a device that manages change history of alarm definition information. The database management apparatus 70 receives alarm definition information from the engineering terminal 50 and provides a database so as to manage such history. Furthermore, it is also possible for the database management apparatus 70 to execute reflection of latest alarm definition information on the alarm management apparatus 30, restoration thereof from history, and/or the like.

The monitoring terminal 90 is a device that acquires an alarm message from the alarm management apparatus 30 and displays such an alarm message and/or a current alarm state. It is possible for an operator O to confirm an alarm message and/or a current alarm state through a display content that is displayed on the monitoring terminal 90.

Additionally, although the process controller 10 is generally configured as dedicated hardware that is linked to each field instrument 2a, at least a part of a so-called Advanced Process Control (APC) server that is configured as a general-purpose PC server may be operated on the process controller 10. Furthermore, the process controller 10 receives data according to a standard to drive and control the plant 2, through a non-illustrated Open Platform Communication (OPC) server or through an original interface, another interface, and/or the like.

Furthermore, it is also possible for the alarm management apparatus 30 to utilize an OPC and it is also possible to utilize a unique standard other than the OPC. In a case where an OPC is utilized, the process controller 10 and the alarm management apparatus 30 transmit or receive data according to a standard of an OPC.

Furthermore, in a case where a unique standard other than an OPC is utilized, the process controller 10 and the alarm management apparatus 30 transmit or receive data according to such a unique standard.

Furthermore, as an example of process control of the process controller 10, Proportional-Integral-Differential Control (PID control) is executed basically. Furthermore, it is possible to execute a high level of control (APC) of the plant 2 optionally by a simulation and/or the like that use(s) control data for the plant 2 that include a control value that is used for control of the plant 2 or a process value that indicates a situation of an operation of the plant 2. Control data are a process value (a process variable) PV, a setting value (a setting variable) SV, an operation value (an operation variable) MV, and the like.

Problem from Viewpoint of Engineer E

Meanwhile, in the alarm system 1', alarm engineering that sets alarm definition information has a few jobs that continue an operation without changing an initial setting. That is because, in a case where maintenance and/or the like such as addition, repair, and/or replacement of the field instrument 2a, update of firmware, and execution of subsequent commissioning is/are executed during an operation thereof, it is expected that a lot of useless alarms are generated by a temporary stop and/or the like of the field instrument 2a.

Herein, although a problem is not caused in a case where an operation of a whole of the plant 2 is temporarily stopped, such a lot of useless alarms disturbs an operation in the plant 2 that partially stops a system and continues an operation. Therefore, in such a case, work that temporarily stops notification of an alarm and/or the like is/are generally executed by temporarily changing a setting of a monitoring range of an operator O and/or changing or restraining an upper and/or a lower limit value(s) of an alarm that is generated from the field instrument 2a that is a target of maintenance.

However, any work is work that is executed by manpower where erroneous alarm engineering may be executed by a mistake in work and/or a mistake in communication so as to provide a serious influence to an operation during an operation. Furthermore, at every maintenance, an engineer E newly designs alarm definition information, obtains approval of a supervisor, causes an operator O to well know it, and finally reflects such alarm definition information on the alarm system 1', so as to impose a heavy burden on such an engineer E. Additionally, moreover, after completion of maintenance, it may be necessary to restore alarm definition information and execute a test thereof, and in such a case, a burden on an engineer E is further increased.

For reference, FIG. 2 illustrates a flow of engineering work. As illustrated in FIG. 2, it is generally considered that respective steps of design (step S1), approval (step S2), a test (step S2), well-knowing (step S4), and reflection (step S5) have to be sequentially executed for reflection of alarm definition information. Although not all steps of steps S1 to S5 are always executed at all system introduction places, alarm engineering has a lot of jobs that have to be executed by a full-time person in charge and is one of work that is frequently executed particularly carefully in engineering for process industry.

Problem from Viewpoint of Operator O

On the other hand, it is difficult for an operator O to accurately recognize a state of the plant 2 where a problem from a viewpoint of an engineer E as described previously is generated, and further, it is difficult to recognize what influence is provided to his/her own monitoring job depending on an state thereof. Although what maintenance is executed and/or what definition information is changed is/are, of course, well known frequency from an engineer E at a time of changing of alarm definition information, a mechanism that is capable of visualizing it is frequently absent in the alarm system 1'.

Hence, an operator O does not understand whether generating of an alarm is true or false, and if such a situation is provided, it is difficult to ensure reliability of an alarm system.

Eventually, in a case where, after completion of maintenance, a mistake in work is caused at a time when alarm definition information is restored, so as to continue restraint of an alarm, or returning to setting at a normal time is forgotten, it is even supposed that an operator O does not at all understand a reason why an alarm is not output.

Hence, in an alarm system 1 according to an embodiment, state transition of a plant 2 is detected based on output information that includes at least an alarm that is output from the plant 2 or an instruction from a user, and in a case where such state transition is detected, first definition information that is definition information on behavior of an alarm during monitoring thereof is changed to second definition information that is the above-mentioned definition information that corresponds to a state of a plant after transition thereof.

General Configuration of Present Embodiment

Figure 3:
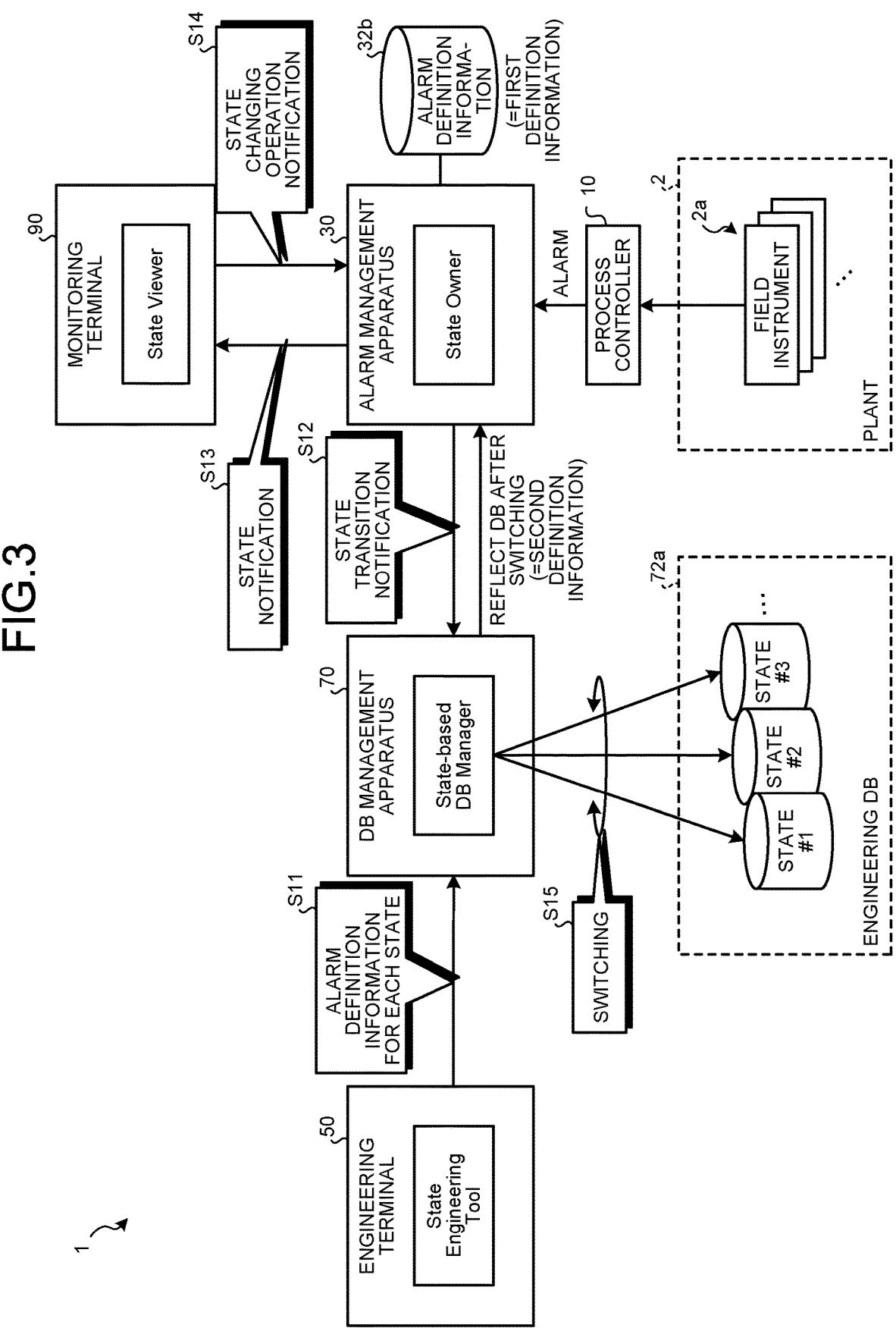
FIG. 3 is a diagram that illustrates a general configuration example of an alarm system according to an embodiment.

FIG. 3 is a diagram that illustrates a general configuration example of an alarm system 1 according to an embodiment. Additionally, FIG. 3 corresponds to FIG. 1, so that a point(s) that is/are different from FIG. 1 will be mainly explained herein.

As illustrated in FIG. 3, in the alarm system 1 according to an embodiment, an alarm management apparatus 30 has a "State Owner" function. Furthermore, an engineering terminal 50 has a "State Engineering Tool" function. Furthermore, a database management apparatus 70 has a "State-based DB Manager" function. Furthermore, a monitoring terminal 90 has a "State Viewer" function.

That is, the alarm system 1 according to an embodiment realizes an alarm monitoring function that is based on a "State" of a plant 2. Herein, a "State" in the present embodiment, that is, a "state" will be explained. FIG. 4 is an explanatory diagram (part 1) of a "state" according to an embodiment. Furthermore, FIG. 5 is an explanatory diagram (part 2) of a "state" according to an embodiment.

As illustrated in FIG. 4, in the alarm system 1 according to an embodiment, a "state" of the plant 2 that is capable of being defined by a user is dealt with so as to be broadly divided into two such as a "system state" and a "hierarchical state".

A "system state" refers to a state for a whole of a control target of the plant 2 that is controlled by a process controller 10. In such a state definition of a "system state", it is not possible to set a range of application of a state as illustrated in the same figure. A state definition where a whole system is a target has to be provided.

Furthermore, a "hierarchical state" refers to a state that is capable of being specified in units of nodes of a hierarchy in a case where each field instrument 2a of the plant 2 and/or the like is/are represented by a hierarchical model. Therefore, in such a state definition of a "hierarchical state", it is possible to set a range of application of a state as illustrated in the same figure. Thus, it is possible to execute application of a "state" to a partial range, so that it is possible to visualize a range that is influenced by maintenance and/or the like, so as to facilitate an operator O to recognize it.

Furthermore, as illustrated in FIG. 5, a "state" of the plant 2 that is capable of being defined by a user includes, for example, a "state during an operation", a "state during maintenance", a "state during commissioning", a "state during engineering", a "system abnormal state", an "emergency situation state", and the like. Additionally, a "state during commissioning" refers to a state where an engineer E executes adjustment and/or the like of a parameter such as a threshold.

Among respective states as illustrated in the same figure, a "state during an operation", a "state during maintenance", a "state during commissioning", and a "state during engineering" are capable of being defined in any of a "system state" and a "hierarchical state". On the other hand, a "system abnormal state" and an "emergency situation state" are capable of being defined as only a "system state".

An explanation for FIG. 3 is returned to. A "State Engineering Tool" function of the engineering terminal 50 is a function that is realized as a part of a tool group as described previously and a function for executing a definition of a "state" that is explained by using FIG. 4 and FIG. 5. The present function defines information on a state (a range of application of a state and a state transition condition) and further defines alarm definition information for each state. The database management apparatus 70 is notified of alarm definition information for each state that is defined by the present function (step S11) and it is registered in an engineering database 72a and managed for each state by the database management apparatus 70.

A "State Owner" function of the alarm management apparatus 30 is realized as a part of an alarm management function of the alarm management apparatus 30. The present function is a function for periodically monitoring a state of the plant 2 and transiting, in a case where a state thereof satisfies a state transition condition as described previously, a state that is internally managed accordingly. Additionally, alarm definition information 32b in the figure that is possessed by the alarm management apparatus 30 is definition information on behavior of an alarm during monitoring in the alarm management apparatus 30. The alarm definition information 32b corresponds to an example of "first definition information".

As a state transition condition is satisfied and state transition of the plant 2 is detected, such a "State Owner" function executes state transition notification that indicates satisfaction of a state transition condition for the database management apparatus 70 so as to induce switching of alarm definition information (step S12).

Furthermore, such a "State Owner" function executes state notification for monitoring a state of the plant 2 for the monitoring terminal 90 (step S13) so as to display a current state of the plant 2, a situation of satisfaction of a state transition condition, and/or the like for an operator O by a "State Viewer" function as described later.

Figure 6:
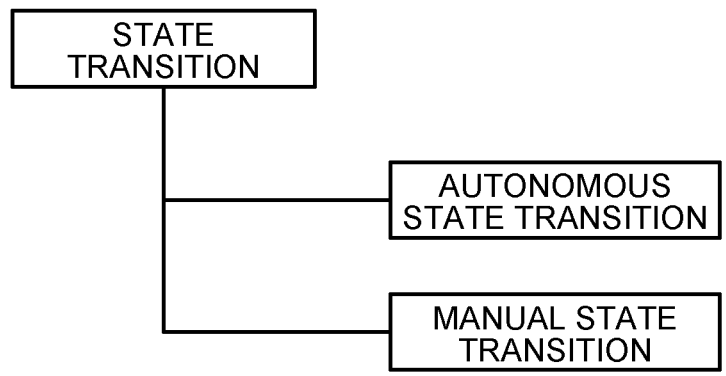
FIG. 6 is an explanatory diagram of "state transition" according to an embodiment.

Herein, FIG. 6 is an explanatory diagram of "state transition" according to an embodiment. As illustrated in FIG. 6, a "state transition" according to an embodiment has two kinds such as "autonomous state transition" and "manual state transition".

"autonomous state transition" periodically monitors a state of the plant 2 and autonomously executes, in a case where such a state satisfies a state transition condition that is defined by an engineer E, state transition notification for the database management apparatus 70 accordingly, as has been already explained.

On the other hand, "manual state transition" is provided in such a manner that an operator O or an engineer E intentionally changes a state. An explanation for FIG. 3 is returned to. In "manual state transition", for example, as a state changing operation that is executed manually is notified of from the monitoring terminal 90 (step S14), a "State Owner" function executes state transition notification for the database management apparatus 70 in response to detection of such notification (step S12) so as to induce switching of alarm definition information, similarly to "autonomous state transition".

A specific process sequence in a case of each of "autonomous state transition" and "manual state transition" will be described later by an explanation that uses FIG. 14 and FIG. 15.

A "State-based DB Manager" function of the database management apparatus 70 is realized by a part of a management function of the engineering database 72a. The present function is a function for executing management of alarm definition information for each state.

The present function has a function that stores, as a database, alarm definition information for each state that is defined by a "State Engineering Tool" function. Then, as state transition notification is received from a "State Owner" function, alarm definition information that corresponds to a state after transition is selected from the engineering database 72a and switching is executed (step S15). A database after switching (that corresponds to an example of "second definition information") that is switched alarm definition information reflects on the alarm management apparatus 30, and subsequently, an operation of alarm monitoring is started with such a switched database that is provided as the alarm definition information 32b by such reflection.

A "State Viewer" function of the monitoring terminal 90 is a function that is realized as a part of a UI function of the monitoring terminal 90. The present function is a UI function for visualizing a state of the plant 2, a situation of satisfaction of a state transition condition, and the like. It is possible for an operator O and an engineer E to recognize what a state the plant 2 is currently provided in, by using the present function. Furthermore, the present function also includes a UI for control to execute "manual state transition" as described previously.

Thus, in the alarm system 1 according to an embodiment, the alarm management apparatus 30 detects state transition of the plant 2 based on output information that includes at least an alarm that is output from the plant 2 or an instruction from a user, and changes, in a case where such state transition is detected, first definition information that is definition information on behavior of an alarm during monitoring to second definition information that is the above-mentioned definition information that corresponds to a state of a plant after transition.

Therefore, it is possible for the alarm management apparatus 30 according to an embodiment to improve efficiency of work of an engineer E and an operator 0 in alarm monitoring of the plant 2. Hereinafter, a configuration example of the alarm system 1 according to an embodiment will be explained more specifically.

Functional Configuration of Alarm Management Device 30

Figure 7:
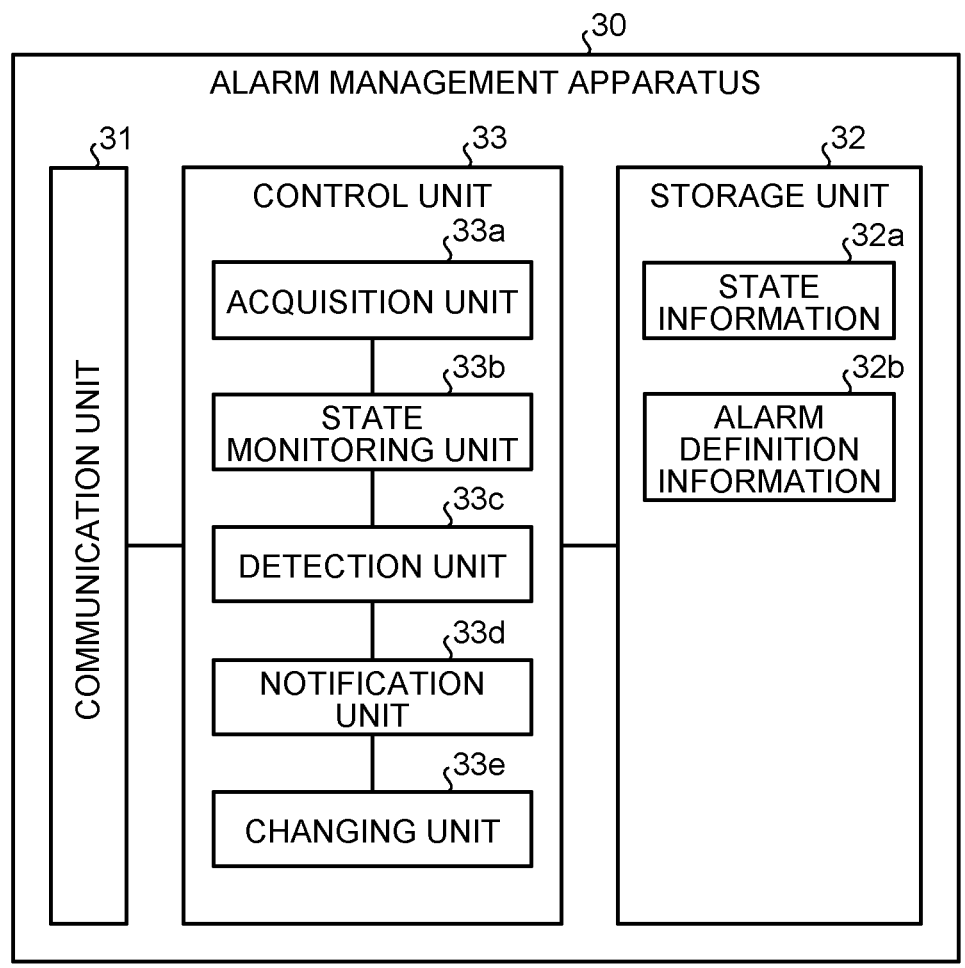
FIG. 7 is a block diagram that illustrates a configuration example of a data management apparatus.

FIG. 7 is a block diagram that illustrates a configuration example of an alarm management apparatus 30. Additionally, in FIG. 7 and FIG. 8 to FIG. 10 as illustrated later, only a component(s) that is/are needed for an explanation of the present embodiment is/are illustrated and illustration for a general component(s) is omitted.

As illustrated in FIG. 7, the alarm management apparatus 30 has a communication unit 31, a storage unit 32, and a control unit 33. Additionally, the alarm management apparatus 30 may have an input unit (for example, a keyboard, a mouse, and/or the like) that receives a variety of operations from a manager and/or the like that utilize(s) the alarm management apparatus 30 and/or an output unit (for example, a display and/or the like) for outputting a variety of information.

The communication unit 31 is realized by, for example, a Network Interface Card (NIC) and/or the like. The communication unit 31 is connected to a network where illustration thereof is omitted in a wired or wireless manner and execute transmission or receipt of a variety of information for a process controller 10, a database management apparatus 70, and a monitoring terminal 90 through such a network.

The storage unit 32 is realized by, for example, a semiconductor memory element such as a Random Access Memory (RAM) and/or a flash memory (Flash Memory) or a storage device such as a hard disk and/or an optical disk, and the storage unit 32 in an example of FIG. 7 stores state information 32a and alarm definition information 32b.

The state information 32a is information on a state that is internally managed by the alarm management apparatus 30 and includes a current state. Furthermore, the state information 32a includes a variety of states of a plant 2 that are defined by an engineer E, a state transition condition for transiting to such a state, and the like.

The alarm definition information 32b corresponds to a current state and is definition information on behavior of an alarm during reflection. The alarm definition information 32b corresponds to an example of "first definition information" as described above.

The control unit 33 is realized by, for example, a Central Processing Unit (CPU), a Micro Processing Unit (MPU), and/or the like where a variety of programs (that corresponds to an example of an alarm management program) that are stored in the storage unit 32 where illustration thereof is omitted are executed in a RAM as a work area. Furthermore, the control unit 33 is realized by, for example, an integrated circuit such as an Application Specific Integrated Circuit (ASIC) and/or a Field Programmable Gate Array (FPGA).

As illustrated in FIG. 7, the control unit 33 has an acquisition unit 33a, a state monitoring unit 33b, a detection unit 33c, a notification unit 33d, and a changing unit 33e, and realizes or executes a function and/or an action of information processing that will be explained below. Additionally, an internal configuration of the control unit 33 is not limited to a configuration as illustrated in FIG. 7 and may be another configuration as long as it is possible for such a configuration to execute information processing as described later. Furthermore, a relation of connection between respective processing units that are possessed by the control unit 33 is not limited to a relation of connection as illustrated in FIG. 7 and may be another relation of connection.

The control unit 33 executes each process for realizing a "State Owner" function as described above.

The acquisition unit 33a acquires an alarm that is output from the process controller 10 through the communication unit 31. Furthermore, the acquisition unit 33a acquires state changing operation notification from the monitoring terminal 90 through the communication unit 31. Furthermore, the acquisition unit 33a acquires a database after switching that is notified of from the database management apparatus 70, that is, alarm definition information that corresponds to a state of the plant 2 after transition, through the communication unit 31. A database after switching corresponds to an example of "second definition information" as described above.

The state monitoring unit 33b periodically monitors a state of the plant 2, based on an alarm from the process controller 10 that is acquired from the acquisition unit 33a.

The detection unit 33c determines whether or not a state of the plant 2 that is monitored by the state monitoring unit 33b satisfies a state transition condition, and detects, in a case of satisfaction thereof, state transition of the plant 2. Furthermore, the detection unit 33c detects state transition of the plant 2 in a case where state changing operation notification is acquired by the acquisition unit 33a.

The notification unit 33d executes, in a case where the detection unit 33c detects state transition, state transition notification for the database management apparatus 70 through the communication unit 31. Furthermore, in a case where the changing unit 33e reflects a database after switching on the alarm definition information 32b, the notification unit 33d transmits changing completion notification to the monitoring terminal 90.

The changing unit 33e reflects, in a case where the acquisition unit 33a acquires a database after switching from the database management apparatus 70, it on the alarm definition information 32b so as to change the alarm definition information 32b to one that corresponds to a state after transition.

Additionally, for supplementing a "State Owner" function, in a case where state transition to a system state is generated, the control unit 33 does not execute identification of a range of application but notifies the database management apparatus 70 of a state change for a whole system. In a case of a hierarchical state, which node state transition is executed for is specifically identified from the state information 32a so as to execute notification.

Furthermore, a "State Owner" function provides an Application Programming Interface (API) that discloses state information to an exterior, so that it is possible for the monitoring terminal 90 and/or an external application to realize acquisition and/or visualization of a state through such an API. Such an API includes, for example, an acquisition interface of state information, an acquisition interface of a satisfaction condition/a release condition of a state transition condition, a state changing notification interface, and/or the like.

Functional Configuration of Engineering Terminal 50

Figure 8:
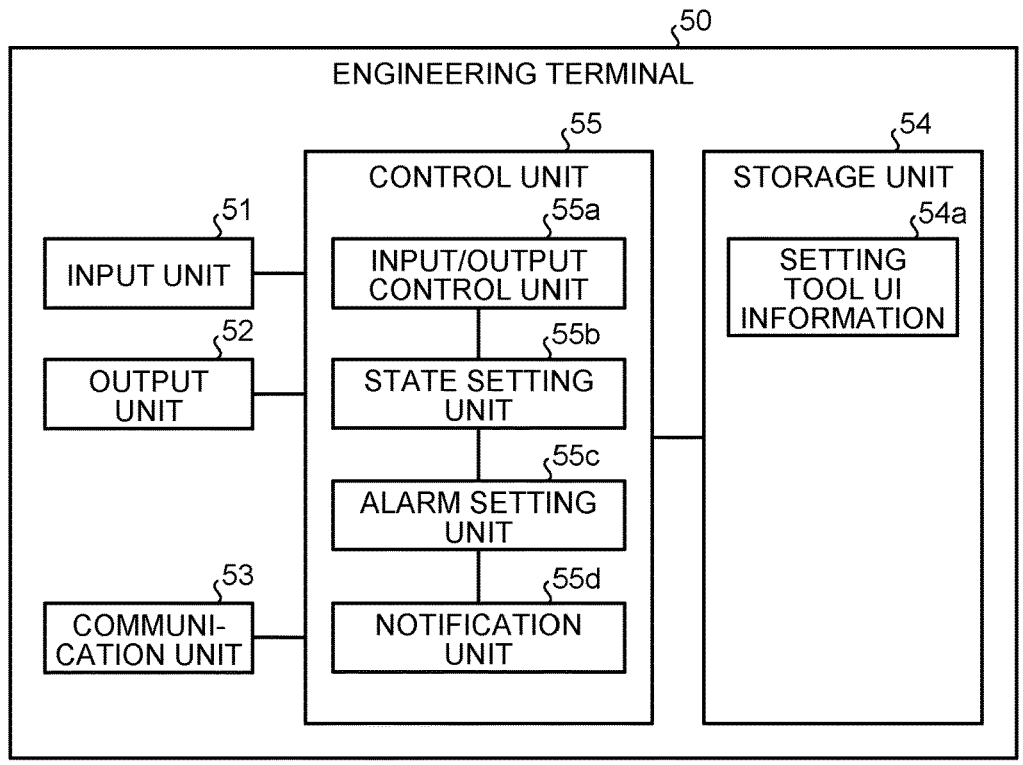
FIG. 8 is a block diagram that illustrates a configuration example of an engineering terminal.

Next, a functional configuration of an engineering terminal 50 will be explained. FIG. 8 is a block diagram that illustrates a configuration example of the engineering terminal 50. As illustrated in FIG. 8, the engineering terminal 50 has an input unit 51, an output unit 52, a communication unit 53, a storage unit 54, and a control unit 55.

The input unit 51 is realized by, for example, a keyboard, a mouse, and/or the like, and receives a variety of operations from an engineer E that utilizes the engineering terminal 50. The output unit 52 is realized by, for example, a display and/or the like, and outputs a variety of information to an engineer E that utilizes the engineering terminal 50. Additionally, the input unit 51 and the output unit 52 may be configured integrally by, for example, a touch panel display and/or the like.

The communication unit 53 is realized by, for example, an NIC and/or the like, similarly to the communication unit 31 as described above. The communication unit 53 is connected to a network where illustration thereof is omitted, in a wired or wireless manner, and executes transmission or receipt of a variety of information for the database management apparatus 70 through such a network.

The storage unit 54 is realized by, for example, a semiconductor memory element such as a RAM and/or a flash memory or a storage device such as a hard disk and/or an optical disk, similarly to the storage unit 32 as described above, and stores setting tool UI information 54a in an example of FIG. 8.

The setting tool UI information 54a is information on a UI for realizing a "State Engineering Tool" function as described above and includes a UI and/or the like that is/are provided to an engineer E.

The control unit 55 is realized by, for example, a CPU, an MPU, and/or the like, similarly to the control unit 33 as described above, where a variety of programs that are stored in the storage unit 54 where illustration thereof is omitted are executed in a RAM as a work area. Furthermore, the control unit 55 is realized by, for example, an integrated circuit such as an ASIC and/or an FPGA.

As illustrated in FIG. 8, the control unit 55 has an input/output control unit 55a, a state setting unit 55b, an alarm setting unit 55c, and a notification unit 55d, and realizes or executes a function and/or an action of information processing that will be explained below. Additionally, an internal configuration of the control unit 55 is not limited to a configuration as illustrated in FIG. 8 and may be another configuration as long as it is possible for such a configuration to execute information processing as described later. Furthermore, a relation of connection between respective processing units that are possessed by the control unit 55 is not limited to a relation of connection as illustrated in FIG. 8 and may be another relation of connection.

The control unit 55 executes each process for realizing a "State Engineering Tool" function as described above.

The input/output control unit 55a executes output control that causes the output unit 52 to output a tool group for defining an attribute value that indicates behavior of an alarm, based on the setting tool UI information 54a. Furthermore, the input/output control unit 55a executes input control for a variety of operations of an engineer E that are input from the input unit 51 through a tool group.

The state setting unit 55b sets a variety of state definitions in an alarm system 1, based on an input value that is input from the input unit 51. Furthermore, the alarm setting unit 55c sets alarm definition information that is linked to each state that is set by the state setting unit 55b, based on an input value that is input from the input unit 51.

The notification unit 55d notifies a database management apparatus 70 of alarm definition information for each state that is set by the alarm setting unit 55c, through the communication unit 53.

Additionally, for supplementing a "State Engineering Tool" function, it is possible for an engineer E to execute a detailed definition of a state. In a detailed definition, it is possible for an engineer E to execute at least a type of a state, and further, in a case of a hierarchical state, a condition definition, and/or a range-of-application definition.

Functional Configuration of Database Management Device 70

Figure 9:
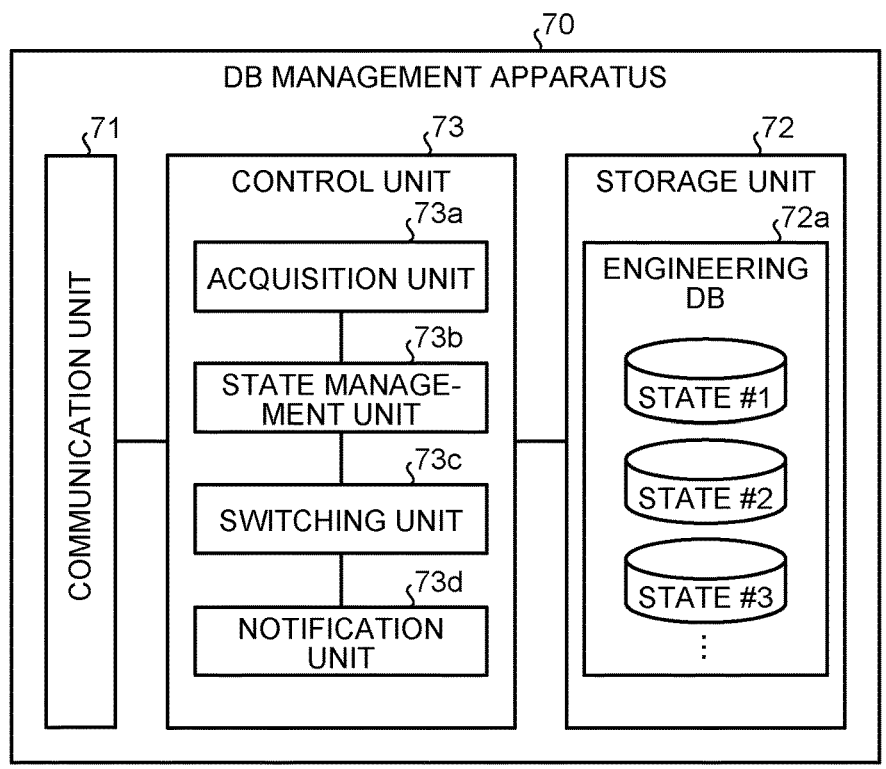
FIG. 9 is a block diagram that illustrates a configuration example of a database management apparatus.

Next, a functional configuration of a database management apparatus 70 will be explained. FIG. 9 is a block diagram that illustrates a configuration example of the database management apparatus 70. As illustrated in FIG. 9, the database management apparatus 70 has a communication unit 71, a storage unit 72, and a control unit 73.

The communication unit 71 is realized by, for example, an NIC and/or the like, similarly to communication units 31, 53 as described above. The communication unit 71 is connected to a network where illustration thereof is omitted, in a wired or wireless manner, and executes transmission or receipt of a variety of information for an alarm management apparatus 30 and an engineering terminal 50 through such a network.

The storage unit 72 is realized by, for example, a semiconductor memory element such as a RAM and/or a flash memory or a storage device such as a hard disk and/or an optical disk, similarly to storage units 32, 54 as described above, and stores an engineering database 72a in an example of FIG. 9.

The engineering database 72a stores alarm definition information for each state as a database.

The control unit 73 is realized by, for example, a CPU, a MPU, and/or the like where a variety of programs that are stored in the storage unit 72 where illustration thereof is omitted are executed in a RAM as a work area, similarly to control units 33, 55 as described above. Furthermore, the control unit 73 is realized by, for example, an integrated circuit such as an ASIC and/or a FPGA.

As illustrated in FIG. 9, the control unit 73 has an acquisition unit 73a, a state management unit 73b, a switching unit 73c, and a notification unit 73d, and realizes or executes a function and/or an action of information processing that will be explained below. Additionally, an internal configuration of the control unit 73 is not limited to a configuration as illustrated in FIG. 9 and may be another configuration as long as it is possible for such a configuration to execute information processing as described later. Furthermore, a relation of connection between respective processing units that are possessed by the control unit 73 is not limited to a relation of connection as illustrated in FIG. 9 and may be another relation of connection.

The control unit 73 executes each process for realizing a "State-based DB Manager" function as described above.

The acquisition unit 73a acquires alarm definition information for each state that is notified of from the engineering terminal 50, through the communication unit 71. Furthermore, the acquisition unit 73a acquires state transition notification from the alarm management apparatus 30 through the communication unit 71.

The state management unit 73b registers alarm definition information for each state that is acquired by the acquisition unit 73a in the engineering database 72a so as to execute management for each state.

The switching unit 73c selects, in a case where the acquisition unit 73a acquires state transition notification from the alarm management apparatus 30, alarm definition information that corresponds to a state after transition from the engineering database 72a so as to execute switching thereof, based on a type of a state after transition that is included in such state transition notification.

The notification unit 73d notifies the alarm management apparatus 30 of alarm definition information that is switched by the switching unit 73c as a database after switching through the notification unit 71.

Additionally, for supplementing a "State-based DB Manager" function, the switching unit 73c decides and determines alarm definition information that should be reflected on the alarm management apparatus 30, in units of nodes, when alarm definition information that corresponds to a state after transition is selected.

Functional Configuration of Monitoring Terminal 90

Figure 10:
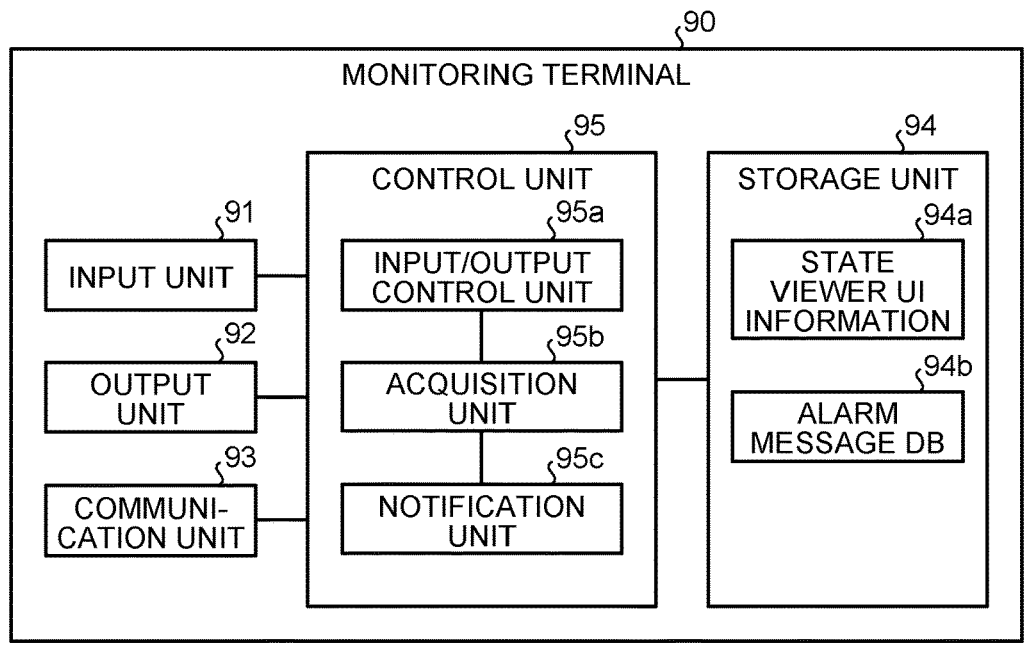
FIG. 10 is a block diagram that illustrates a configuration example of a monitoring terminal.

Next, a functional configuration of a monitoring terminal 90 will be explained. FIG. 10 is a block diagram that illustrates a configuration example of the monitoring terminal 90. As illustrated in FIG. 10, the monitoring terminal 90 has an input unit 91, an output unit 92, a communication unit 93, a storage unit 94, and a control unit 95.

The input unit 91 is realized by, for example, a keyboard, a mouse, and/or the like, similarly to an input unit 51 as described above, and receives a variety of operations from an operator O that utilizes the monitoring terminal 90. The output unit 92 is realized by, for example, a display and/or the like, similarly to an output unit 52 as described above, and outputs a variety of information to an operator O that utilizes the monitoring terminal 90. Additionally, the input unit 91 and the output unit 92 may be configured integrally by, for example, a touch panel display and/or the like.

The communication unit 93 is realized by, for example, an NIC and/or the like, similarly to communication units 31, 53, 71 as described above. The communication unit 93 is connected to a network where illustration thereof is omitted, in a wired or wireless manner, and executes transmission or receipt of a variety of information for the alarm management apparatus 30 through such a network.

The storage unit 94 is realized by, for example, a semiconductor memory element such as a RAM and/or a flash memory or a storage device such as a hard disk and/or an optical disk, similarly to storage units 32, 54, 72 as described above, and stores a state viewer UI information 94a and an alarm massage database 94b in an example of FIG. 10.

The state viewer UI information 94a is information on a UI for realizing a "State Viewer" function as described above and includes a UI and/or the like that is/are provided to an operator O.

The alarm massage database 94b is a database that stores an alarm message that is acquired from the alarm management apparatus 30 by an acquisition unit 95b as described later.

The control unit 95 is realized by, for example, a CPU, a MPU, and/or the like where a variety of programs that are stored in the storage unit 94 where illustration thereof is omitted are executed in a RAM as a work area, similarly to control units 33, 55, 73 as described above. Furthermore, the control unit 95 is realized by, for example, an integrated circuit such as an ASIC and/or a FPGA.

As illustrated in FIG. 10, the control unit 95 has an input/output control unit 95a, an acquisition unit 95b, and a notification unit 95c, and realizes or executes a function and/or an action of information processing that will be explained below. Additionally, an internal configuration of the control unit 95 is not limited to a configuration as illustrated in FIG. 10 and may be another configuration as long as it is possible for such a configuration to execute information processing as described later. Furthermore, a relation of connection between respective processing units that are possessed by the control unit 95 is not limited to a relation of connection as illustrated in FIG. 10 and may be another relation of connection.

The control unit 95 executes each process for realizing a "State Viewer" function as described above.

The input/output control unit 95a executes output control that displays, on the output unit 92, a plant state monitoring screen that is a state viewer that visualizes a state and/or the like of the plant 2 and/or an alarm message monitoring screen that visualizes an alarm message, based on the state viewer UI information 94a and the alarm message database 94b.

Figure 11:
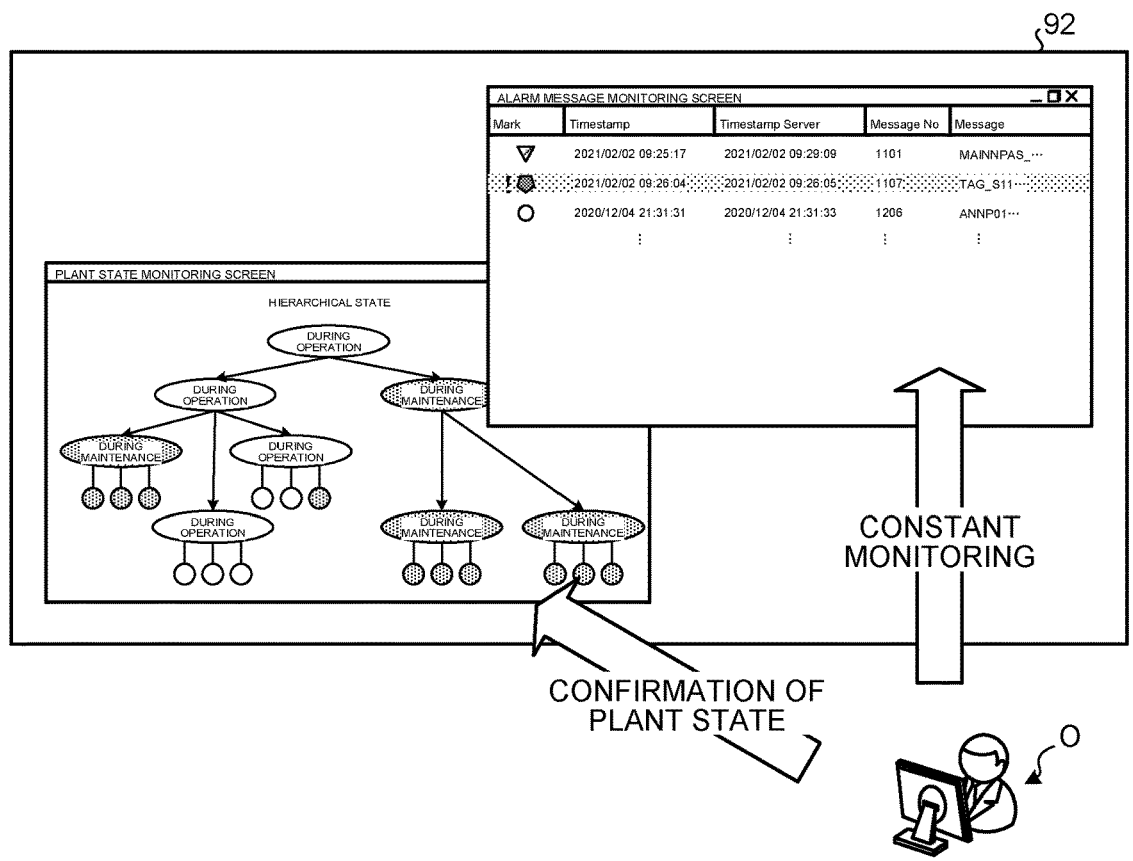
FIG. 11 is a diagram that illustrates a display example of an output unit of a monitoring terminal.
Figures 12, 13:
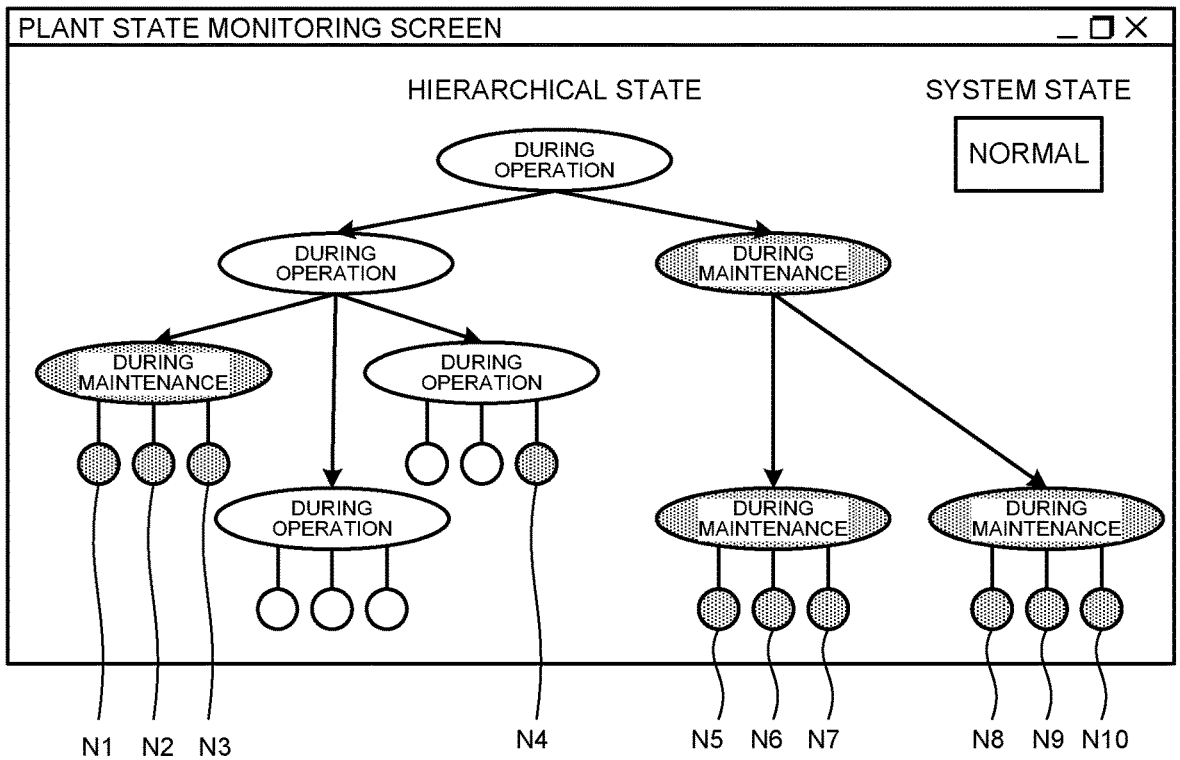
FIG. 12 is a diagram that illustrates a display example of an alarm message monitoring screen.
FIG. 13 is a diagram that illustrates a display example of a plant state monitoring screen.

Herein, a display example that is displayed on the output unit 92 by the input/output control unit 95a will be explained by using FIG. 11 to FIG. 13. FIG. 11 is a diagram that illustrates a display example of the output unit 92 of the monitoring terminal 90. Furthermore, FIG. 12 is a diagram that illustrates a display example of an alarm message monitoring screen. Furthermore, FIG. 13 is a diagram that illustrates a display example of a plant state monitoring screen.

As illustrated in FIG. 11, the input/output control unit 95a displays an alarm message monitoring screen and a plant state monitoring screen in combination on the output unit 92.

As illustrated in FIG. 12, on an alarm message monitoring screen, a time stamp, a message number, a content of a message, and/or the like, as well as a symbol that indicates a message level of an alarm message, is/are displayed.

Furthermore, as illustrated in FIG. 13, on a plant state monitoring screen, a system state for a whole system and a hierarchical state in a case where each field instrument 2a and/or the like of the plant 2 is expressed by a hierarchical model are displayed in combination.

FIG. 13 illustrates, for example, a system state that is "normal". Furthermore, a hierarchical state indicates that partial nodes N1 to N10 are not provided in states during an operation but are operated as a whole.

Furthermore, the same figure illustrates nodes N1 to N3 and N5 to N10 that is provided under an influence that is associated with a state during maintenance. On the other hand, node N4 is illustrated that is provided in a state during an operation but provides an indication of some abnormality.

Therefore, as illustrated in FIG. 11, it is possible for an operator O to constantly monitor, for example, an alarm message monitoring screen, and confirm a plant state on a plant state monitoring screen as needed.

For example, even if an alarm message for nodes N1 to N3 and N5 to N10 is not displayed on an alarm message monitoring screen, it is possible for an operator O to accurately recognize that these nodes are not abnormal but are provided under an influence of a state during maintenance, on a plant state monitoring screen.

On the other hand, in a case where an alarm message for a node N4 is displayed on an alarm message monitoring screen, such a node should not be provided under an influence of a state during maintenance, so that it is possible for an operator O to recognize that an indication of some abnormality or abnormality is caused therein, on a plant state monitoring screen.

Furthermore, in a case where a few alarm messages are provided on an alarm message monitoring screen, it is possible for an operator O to immediately recognize whether a part of nodes is provided in a state during maintenance and/or the like other than a state during an operation, on a plant state monitoring screen.

Furthermore, in a case where, on the other hand, too many alarm messages are provided on an alarm message monitoring screen, many alarms are generated on a plant state monitoring screen, for example, even though a state during a normal operation is provided, so that it is possible for an operator O to immediately recognize that an indication of abnormality or abnormality is provided in a whole or a part of a system.

An explanation for FIG. 10 is returned to. Furthermore, the input/output control unit 95a executes input control for a variety of operations of an operator O that is input from the input unit 51. For example, in a case where a state changing operation is input through the input unit 91, the input/output control unit 95a receives it.

The acquisition unit 95b acquires an alarm message from the alarm management apparatus 30 through the communication unit 93 and stores it in the alarm message database 94b.

The notification unit 95c notifies, in a case where the input/output control unit 95a receives a state changing operation that is executed by an operator O, the alarm management apparatus 30 of a received state changing operation through the communication unit 93.

Process Sequence of Autonomous State Transition Process

Next, a process sequence of an autonomous state transition process that is executed by an alarm system 1 will be explained by using FIG. 14. FIG. 14 is a process sequence of an autonomous state transition process.

Figure 14:
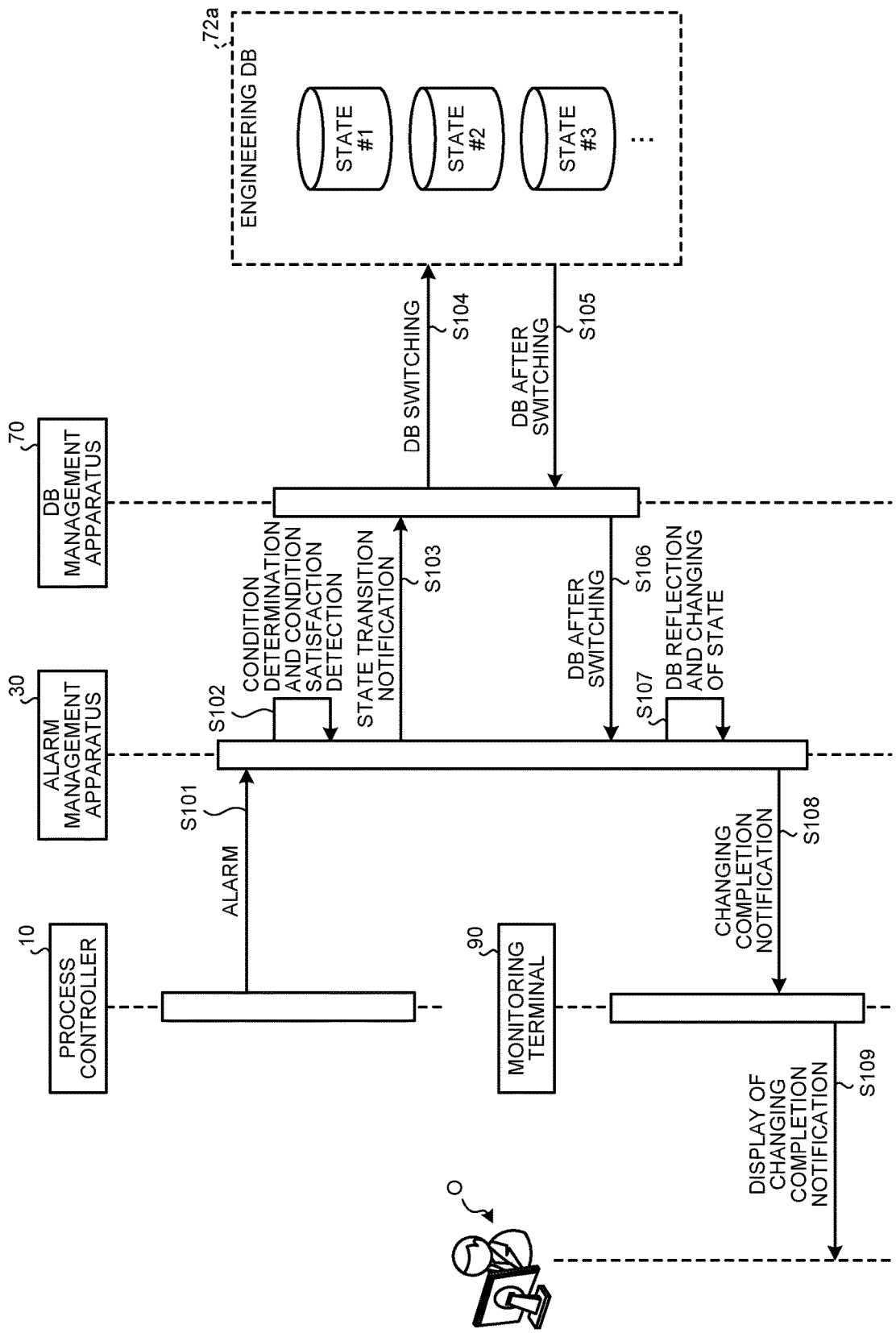
FIG. 14 is a process sequence of an autonomous state transition process.

As illustrated in FIG. 14, a process controller 10 outputs an alarm to an alarm management apparatus 30 as needed (step S101). Then, the alarm management apparatus 30 executes a condition determination of a state transition condition as needed, based on such an alarm and detects condition satisfaction (step S102). Additionally, it is also possible to use information other than an alarm for condition determination of a state transition condition. For example, satisfaction of a conditional expression that is specified by a user that uses a process data value and/or the like is/are supposed. Such an example is specifically useful for a case where state transition is executed in a case where a composite condition such as a temperature of a thermometer A being a first threshold or greater, a temperature of a thermometer B being a second threshold or greater, a pressure of a pressure gauge C being a third threshold or greater, . . . , is satisfied for each process data value, and/or the like. Additionally, in such a case, no alarm may be output, so that the alarm management apparatus 30 has to monitor a process data value.

Then, in a case where condition satisfaction is detected, the alarm management apparatus 30 executes state transition notification for a database management apparatus 70 (step S103). As the database management apparatus 70 receives state transition notification, database switching that selects alarm definition information that corresponds to a state after transition from an engineering database 72a so as to provide database after switching is executed based on it (steps S104, S105).

Then, the database management apparatus 70 notifies the alarm management apparatus 30 of a database after switching (step S106). The alarm management apparatus 30 reflects on a database after switching notified of and changes a state that is internally managed by the alarm management apparatus 30 (step S107). Subsequently, an operation of alarm monitoring is started for alarm definition information 32b after switching.

Then, the alarm management apparatus 30 executes changing completion notification for a monitoring terminal 90 (step S108) and the monitoring terminal 90 executes display of such changing completion notification (step S109) so as to present it to an operator O.

Process Sequence of Manual State Transition Process

Next, a process sequence of a manual state transition process that is executed by an alarm system 1 will be explained by using FIG. 15. FIG. 15 is a process sequence of a manual state transition process.

Figure 15:
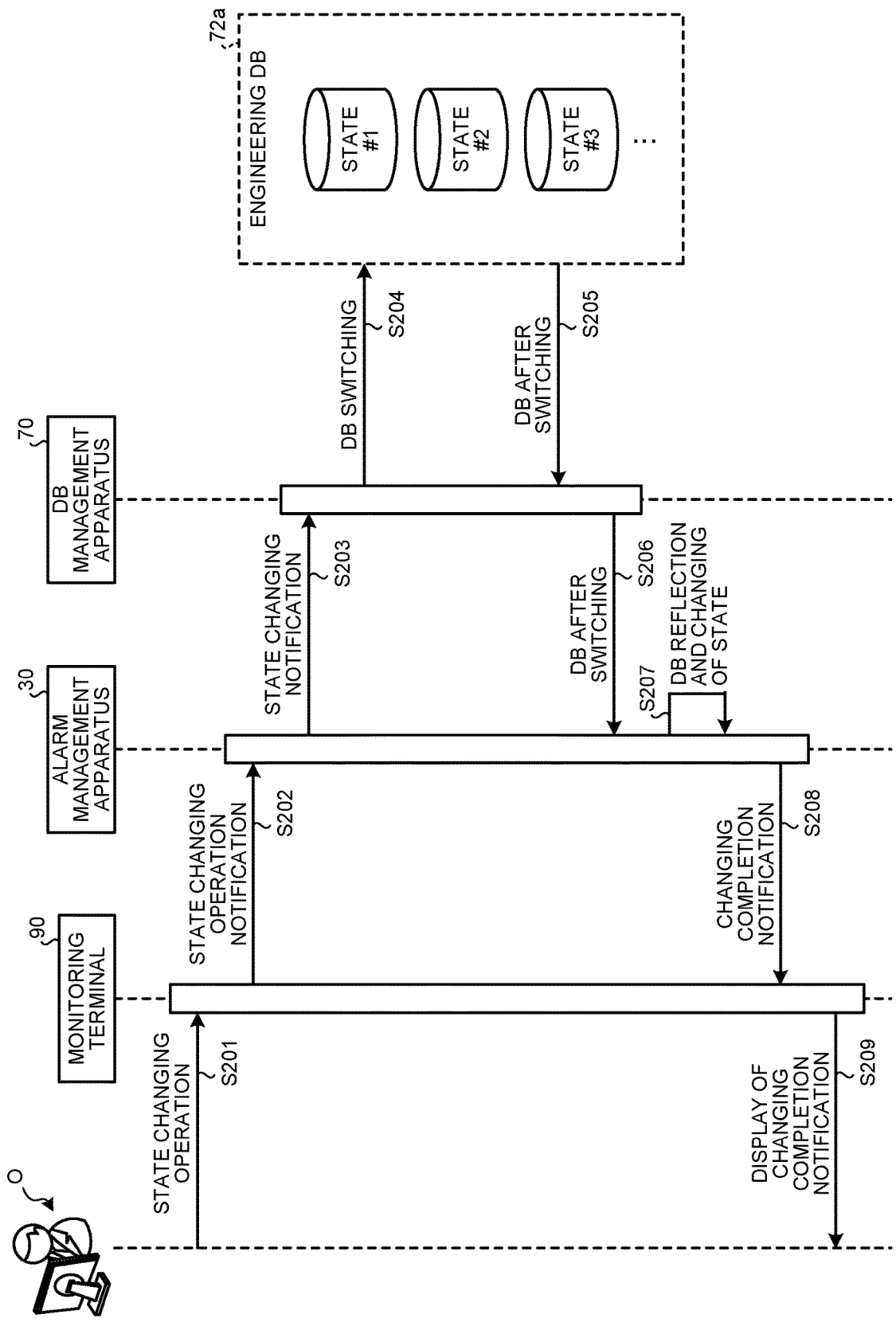
FIG. 15 is a process sequence of a manual state transition process.

As illustrated in FIG. 15, as an operator O intentionally executes a state changing operation (step S201), a monitoring terminal 90 receives it and executes state changing operation notification for an alarm management apparatus 30 (step S202).

As the alarm management apparatus 30 receives state changing operation notification, state transition notification is executed for a database management apparatus 70 (step S203). As the database management apparatus 70 receives state transition notification, alarm definition information that corresponds to a state after transition is selected from an engineering database 72a based on it and data switching is executed so as to provide a database after switching (steps S204, S205).

Then, the database management apparatus 70 notifies the alarm management apparatus 30 of a database after switching (step S206). The alarm management apparatus 30 reflects a database after switching notified of thereon and changes a state that is internally managed by the alarm management apparatus 30 (step S207). Subsequently, an operation of alarm monitoring is started for alarm definition information 32b after switching.

Then, the alarm management apparatus 30 executes changing completion notification for the monitoring terminal 90 (step S208), and the monitoring terminal 90 executes display of such changing completion notification (step S209) and presents it to an operator O.

Effect

As has been described above, an alarm management apparatus 30 according to an embodiment has a detection unit 33c that detects a state transition of a plant 2 based on output information that includes at least an alarm that is output from the plant 2 or an instruction from a user, and a changing unit 33e that changes, in a case where such state transition is detected, alarm definition information 32b (that corresponds to an example of "first definition information") that is definition information on behavior of the alarm during monitoring to a database after switching (that corresponds to an example of "second definition information") that is the definition information that corresponds to a state of the plant 2 after a transition. Therefore, for an alarm management apparatus 30 according to an embodiment, it is possible to improve efficiency of work of an engineer E and an operator O in alarm monitoring of a plant 2.

Specifically, it is possible for an engineer E to preliminarily design comprehensive alarm engineering that also includes maintenance, commissioning, and/or the like. Furthermore, thereby, examining of a method for support at every maintenance and/or the like does/do not have to be executed, so that it is possible to expect that an overhead of work is reduced. Furthermore, a system autonomously executes switching of engineering, so that it is possible to update alarm definition information 32b efficiently and reliably and it is possible to resolve occurrence of a mistake at a time of switching.

Furthermore, it is possible for an operator O to recognize what a change is executed when maintenance and/or commissioning is/are executed. Furthermore, it is possible to incorporate a test of such a "state" even at a time of simulation, and it is possible to expect that an accident in an actual operation situation is decreased. Furthermore, a UI for confirming a state of a plant 2 is provided as a system, so that it is possible to confirm what a situation an alarm is currently operated in, in a real time, and it is possible to efficiently recognize which alarm engineering is changed in.

Furthermore, the changing unit 33e updates the alarm definition information 32b by the database after switching that is selected from the definition information that is preliminarily defined for each state of the plant 2, based on state transition notification that indicates a content of the state transition. Therefore, for an alarm management apparatus 30 according to an embodiment, it is possible to switch alarm definition information 32b efficiently for each state of a plant 2, based on definition information that is preliminarily defined for each state of such a plant 2.

Furthermore, the above-mentioned output information further includes process data, the detection unit 33c detects the state transition based on one or both of the alarm and the process data that are output from the plant 2, and the changing unit 33e autonomously changes the alarm definition information 32b in response to the state transition that is detected based on the alarm and the process data. Therefore, for an alarm management apparatus 30 according to an embodiment, it is possible to update alarm definition information 32b efficiently and reliably by an autonomous state transition process, and it is possible to resolve occurrence of a mistake at a time of switching.

Furthermore, the detection unit 33c detects the state transition based on a state changing operation from the user that includes an operator O that monitors the alarm, and the changing unit 33e changes the alarm definition information 32b in response to the state transition that is detected based on the state changing operation. Therefore, for an alarm management apparatus 30 according to an embodiment, it is possible to cause an intentional state transition of an operator O and/or an engineer E by a manual state transition process and execute, for example, an efficient test and/or the like based on it.

Furthermore, the definition information on behavior of an alarm is capable of defining a state of the plant 2 in units of a node of a hierarchy in a case where a field instrument 2a and/or the like (that correspond(s) to an example of a "control target instrument") in the plant 2 is represented as a hierarchical model, and the changing unit 33e is capable of selecting the database after switching in the above-mentioned definition information for each state of the plant 2 that is preliminarily defined in units of the above-mentioned node. Therefore, for an alarm management apparatus 30 according to an embodiment, it is possible to assist monitoring work of an operator O without generating a lot of useless alarms, even in a case where a part of field instruments 2a is temporarily stopped and an operation of a plant 2 is continued.

Furthermore, the alarm management apparatus 30 according to an embodiment further has a notification unit 33d that notifies a monitoring terminal 90 of a state of the plant in such a manner that a state of the plant 2 in units of the node that is based on the hierarchical model is capable of being displayed. Therefore, for an alarm management apparatus 30 according to an embodiment, it is possible to visualize a range where an influence is provided by maintenance and/or the like, so as to facilitate recognizing of an operator O.

Another/Other Embodiment(s)

Additionally, although an embodiment(s) of the present embodiment has/have been explained above, the present invention may be implemented in various kinds of different forms other than an embodiment(s) as described above.

Display Example, etc.

A display layout of a display example and/or the like that is/are used in an embodiment(s) as described above are merely an example(s) and is/are able to be changed freely.

Association with Batch Processing Function

Furthermore, in an embodiment(s) as described above, behavior of an alarm may be changed depending on progress of a process, in association with a batch processing function. In such a case, a point of view is developed from a state of a plant 2, it is possible to expect that a detection condition for an alarm is changed depending on progress of a process in a batch process of such a plant 2.

Engineering Assistance Function

Furthermore, in an embodiment(s) as described above, in order to facilitate engineering work at a time of maintenance, for example, in a case where a state of a plant 2 is transited, it may be possible to execute batch engineering work for a range of application in such a manner that an alarm that is generated from a range of application of a state after transition is automatically and all notified of at a low priority, etc.

Association with Simulator Function

Furthermore, in an embodiment(s) as described above, when a simulation is executed in an actual site, a simulator function that executes such a simulation is associated therewith, so that it is possible to expect that it is possible to readily execute a simulation at a time of execution of maintenance and/or commissioning.

System

It is possible to freely change information that includes a process procedure, a control procedure, a specific name, and/or a variety of data and/or parameters that is/are illustrated in a document(s) and/or a drawing(s) as described above, unless otherwise described.

Furthermore, each component of each device as illustrated in the drawing(s) is functionally conceptual and does not have to be physically configured as illustrated in the drawing(s). That is, a specific form of dispersion and/or integration of respective devices is not limited to one as illustrated in the drawing(s). That is, it is possible to disperse/integrate all or a part thereof functionally or physically in any unit, depending on a variety of loads, usage, and/or the like, so as to provide a configuration thereof.

Moreover, all or any part of each process function that is executed in each device is/are able to be realized by a CPU and a program that is analyzed and executed by such a CPU or is/are able to be realized as hardware that is provided by a wired logic.

Hardware

Figure 16:
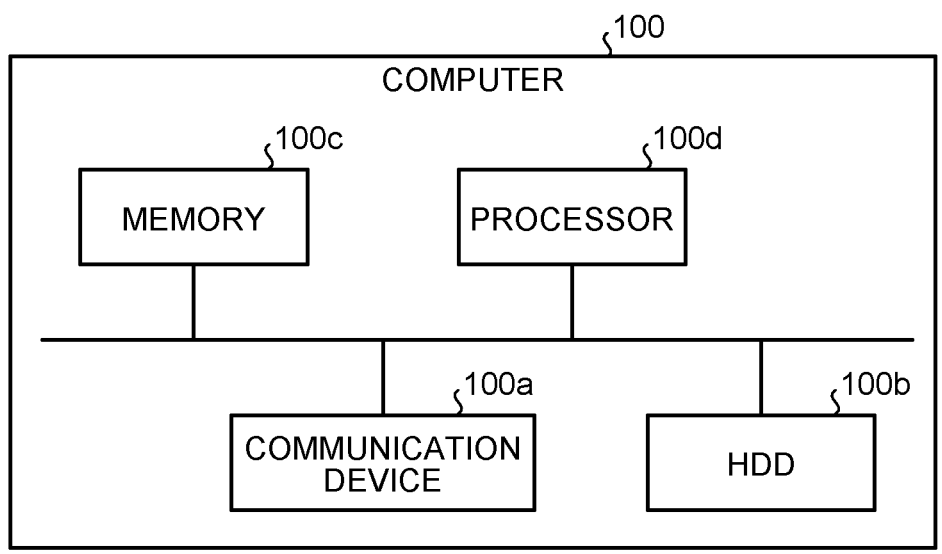
FIG. 16 is a hardware configuration diagram that illustrates an example of a computer that realizes a function of an alarm management apparatus.

The alarm management apparatus 30, the engineering terminal 50, the database management apparatus 70, the monitoring terminal 90, and the like according to an embodiment as has been described above are realized by, for example, a computer 100 with a configuration as illustrated in FIG. 16. Hereinafter, the alarm management apparatus 30 will be provided and explained as an example. FIG. 16 is a hardware configuration diagram that illustrates an example of a computer 100 that realizes a function of the alarm management apparatus 30 according to an embodiment.

As illustrated in FIG. 16, the computer 100 has a communication device 100a, a Hard Disk Drive (HDD) 100b, a memory 100c, and a processor 100d. Furthermore, respective units as illustrated in FIG. 16 are mutually connected by a bus and/or the like.

The communication device 100a is an NIC and/or the like and executes communication with another/other device(s). The HDD 100b stores a program and/or a database that operate(s) a function as illustrated in FIG. 7.

The processor 100d reads from the HDD 100b and/or the like, and develops on the memory 100c, a program that executes a process that is similar to that of each processing unit as illustrated in FIG. 7, so as to operate a process that executes each function that is explained in FIG. 7 and/or the like. For example, such a process executes a function that is similar to that of each processing unit that is possessed by an alarm management apparatus 30. Specifically, the processor 100d reads, from the HDD 100b and/or the like, a program that has functions that are similar to those of an acquisition unit 33a, a state monitoring unit 33b, a detection unit 33c, a notification unit 33d, a changing unit 33e, and/or the like. Then, the processor 100d executes a process that executes processes that are similar to those of the acquisition unit 33a, the state monitoring unit 33b, the detection unit 33c, the notification unit 33d, the changing unit 33e, and/or the like.

Thus, the computer 100 reads and executes a program so as to operate as an information processing device that executes a variety of processing methods. Furthermore, the computer 100 reads a program as described above from a recording medium by a medium reading device and executes a read program as described above, so that it is also possible to realize a function that is similar to that of a practical example as described above.

Additionally, a program that is herein referred to is not limited to one that is executed by only the computer 100. For example, even in a case where a computer or a server that has another hardware configuration executes a program and/or a case where these are cooperated so as to execute a program, it is possible to apply the present invention thereto similarly.

It is possible to distribute such a program through a network such as Internet. Furthermore, such a program is recorded in a computer-readable recording medium such as a hard disk, a flexible disk (FD), a CD-ROM, a Magneto-Optical disk (MO), and/or a Digital Versatile Disc (DVD) and is read from such a recording medium by a computer so as to be able to be executed. The recording medium in which the program is stored is also one embodiment of the present disclosure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An alarm management apparatus comprising:
   a detection unit configured to detect a state transition of a plant based on output information that includes at least an alarm that is output from the plant or an instruction from a user; and
   a changing unit configured to change, in a case where the state transition is detected, first definition information that is definition information on behavior of the alarm during monitoring to second definition information that is the definition information that corresponds to a state of the plant after the transition.

2. The alarm management apparatus according to claim 1, wherein
   the changing unit is further configured to update the first definition information by the second definition information that is selected from the definition information that is preliminarily defined for each state of the plant, based on state transition notification that indicates the state transition.

3. The alarm management apparatus according to claim 1, wherein:
   the output information further includes process data;
   the detection unit is further configured to detect the state transition based on one or both of the alarm and the process data that are output from the plant; and
   the changing unit is further configured to change autonomously the first definition information in response to the state transition that is detected based on the alarm and the process data.

4. The alarm management apparatus according to claim 1, wherein:
   the detection unit is further configured to detect the state transition based on a state changing operation from the user that includes an operator that monitors the alarm; and
   the changing unit is further configured to change the first definition information in response to the state transition that is detected based on the state changing operation.

5. The alarm management apparatus according to claim 1, wherein:
   the definition information is capable of defining a state of the plant in units of a node of a hierarchy in a case where a control target instrument in the plant is represented as a hierarchical model; and
   the changing unit is further configured to be capable of selecting the second definition information in the definition information for each state of the plant that is preliminarily defined in units of the node.

6. The alarm management apparatus according to claim 5, further comprising
   a notification unit configured to notify a monitoring terminal of a state of the plant in such a manner that a state of the plant in units of the node that is based on the hierarchical model is capable of being displayed.

7. An alarm management method, wherein
   a computer executes a process, the process comprising:
   detecting a state transition of a plant based on output information that includes at least an alarm that is output from the plant or an instruction from a user; and
   changing, in a case where the state transition is detected, first definition information that is definition information on behavior of the alarm during monitoring to second definition information that is the definition information that corresponds to a state of the plant after the transition.

8. A non-transitory computer-readable recording medium having stored therein an alarm management program that causes a computer to execute a process, the process comprising:
   detecting a state transition of a plant based on output information that includes at least an alarm that is output from the plant or an instruction from a user; and
   changing, in a case where the state transition is detected, first definition information that is definition information on behavior of the alarm during monitoring to second definition information that is the definition information that corresponds to a state of the plant after the transition.

* * * * *